United States Patent
Kato et al.

(10) Patent No.: US 6,900,925 B2
(45) Date of Patent: May 31, 2005

(54) OPTICAL DEFLECTOR AND METHOD OF PRODUCING SAME

(75) Inventors: Takahisa Kato, Palo Alto, CA (US); Takayuki Yagi, Kanagawa (JP); Yasuhiro Shimada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/608,109

(22) Filed: Jun. 30, 2003

(65) Prior Publication Data

US 2004/0070816 A1 Apr. 15, 2004

(30) Foreign Application Priority Data

Jul. 5, 2002 (JP) ........................................ 2002-197129

(51) Int. Cl.[7] .............................................. G02B 26/08
(52) U.S. Cl. ........................ 359/298; 359/280; 359/223
(58) Field of Search ................................ 359/298, 280, 359/223, 224

(56) References Cited

U.S. PATENT DOCUMENTS

| | | | | |
|---|---|---|---|---|
| 6,154,302 A | 11/2000 | Yagi et al. | .................... | 359/198 |
| 6,201,226 B1 | 3/2001 | Shimada et al. | .......... | 250/201.3 |
| 6,215,114 B1 | 4/2001 | Yagi et al. | .................... | 250/216 |
| 6,327,087 B1 | 12/2001 | Hashimoto et al. | .......... | 359/586 |
| 6,333,497 B2 | 12/2001 | Shimada et al. | .......... | 250/201.3 |
| 6,335,522 B1 | 1/2002 | Shimada et al. | .......... | 250/201.3 |
| 6,392,776 B1 * | 5/2002 | Murakami et al. | ........... | 359/224 |
| 6,408,123 B1 | 6/2002 | Kuroda et al. | .............. | 385/130 |
| 6,436,265 B1 | 8/2002 | Shimada et al. | .............. | 205/125 |
| 6,477,132 B1 | 11/2002 | Azuma et al. | ............... | 369/126 |
| 2002/0114053 A1 * | 8/2002 | Yasuda et al. | ............... | 359/224 |
| 2003/0137711 A1 * | 7/2003 | Yagi et al. | .................... | 359/224 |
| 2003/0218787 A1 * | 11/2003 | Miyajima et al. | ............ | 359/199 |

FOREIGN PATENT DOCUMENTS

| | | |
|---|---|---|
| JP | 06-82711 | 3/1994 |
| JP | 00-147419 | 5/2000 |

* cited by examiner

Primary Examiner—Scott J. Sugarman
Assistant Examiner—M. Hasan
(74) Attorney, Agent, or Firm—Fitzpatrick, Cella, Harper & Scinto

(57) ABSTRACT

There are provided a small optical deflector that can be driven at a high speed with a low voltage, provides a large angle of deflection, has a low distortion even in high speed operation and has a high static flatness of a reflective surface, and a method of producing the optical deflector. The optical deflector drives a movable plate relative to a supporting substrate to deflect a light incident on a reflective surface and has a configuration in which at least two recesses are formed in a surface of the movable plate on which the reflective surface is not formed, and a magnetic material is provided in the recesses.

13 Claims, 13 Drawing Sheets

OPTICAL DEFLECTOR AND METHOD OF PRODUCING SAME

BACKGROUND OF THE INVENTION

1. Field of the Invention

The present invention relates to an optical deflector that deflects incident light, a method of producing the same, and an optical device using the same.

2. Related Background Art

In recent years, with the development of microelectronics as represented by the increasing integration density of semiconductor devices, various devices have been enhanced in capability and reduced in size. For example, image display devices, such as laser beam printers and head-mounted displays, and optical intake units or the like of input devices, such as barcode readers, in which an optical deflector is used for optical scanning, have also been enhanced in capability and reduced in size and are being required to be further down-sized. Optical deflectors meeting such a requirement have been proposed in Japanese Patent Application Laid-Open No. 6-82711 (no corresponding document in foreign language) and Japanese Patent Application Laid-Open No. 2000-147419 (no corresponding document in foreign language), for example.

FIG. 16 is a perspective view of a first conventional optical deflector disclosed in Japanese Patent Application Laid-Open No. 6-82711.

A scanning mirror 1001 of the optical deflector is in the form of a rectangular plate and comprises a glass plate 1009, a mirror part 1002 capable of reflecting a light formed on one side of the glass plate by evaporation of aluminum or the like, and a rare-earth permanent magnet 1003, such as a samarium-cobalt (SmCo) magnet, formed in the shape of a thin film on the other side of the glass plate by sputtering or the like. Supporting members 1004 in the form of strips made of a metal, for example stainless steel or beryllium copper, are each fixed, at one end thereof, to the center of both longitudinal ends of the mirror part 1002 and supported thereon and fixed, at the other end thereof, to a device main body (not shown). The angle of the scanning mirror 1001 can be changed around a torsion axis 1005 connecting the supporting members 1004 by torsion of the supporting members 1004. The permanent magnet 1003 is magnetized so as to have opposite polarities on both sides of the driving axis 1005, as shown in FIG. 16.

Furthermore, a magnetism-generating unit 1006 comprises a coil frame 1008 and a coil 1007 wound around the coil frame and is disposed at a predetermined distance from the side of the scanning mirror 1001 on which the permanent magnet 1003 is formed. Therefore, when the coil 1007 is energized, the magnetism generating unit 1006 generates magnetism, and an attractive or repulsive force arises between the magnetic poles of the permanent magnet 1003 and the magnetism generating unit. The force activates the scanning mirror 1001 and displaces the same to any angle according to the magnetism generated by the magnetism generating unit 1006.

FIG. 17A is an exploded perspective view of a second conventional optical deflector disclosed in Japanese Patent Application Laid-Open No. 2000-147419, and FIG. 17B is a schematic sectional view taken in the longitudinal direction of the optical deflector of FIG. 17A.

As shown in FIG. 17A, an optical deflector 2001 has a planar rectangular base 2002. A ridge 2003, formed integrally with the base 2002, protrudes from the entire outer periphery of the base 2002, and a vibration unit 2005 is provided on the ridge 2003.

The vibration unit 2005 comprises a rectangular outer frame 2006, a reflective mirror 2007 having a reflective surface 2007a formed thereon and disposed in an opening 2006a of the outer frame 2006, and a pair of supporting parts 2008 that couples the reflective mirror 2007 and the outer frame 2006 with each other along an axis substantially passing through the center of gravity of the reflective mirror 2007. The outer frame 2006 is fixed to the ridge 2003, and the reflective mirror 2007 can be swung around the pair of supporting member 2008 serving as a torsion axis CL.

On the back surface of the reflective mirror 2007, there is formed a mirror-side comb section 2009 composed of a groove 2009a and a projection 2009b extending in a direction perpendicular to the torsion axis CL. A pair of fixed electrodes 2010 and 2011 is disposed on the base 2002 so as to be in opposition to the mirror-side comb section 2009 of the reflective mirror 2007, and also on the upper side of each of the paired fixed electrodes 2010 and 2011, there is formed an electrode-side comb section 2012 composed of a groove 2012a and a projection 2012b. The mirror-side comb section 2009 and the electrode-side comb section 2012 are disposed in such a manner that the groove 2009a and the projection 2009b engages with the groove 2012a and the projection 2012b. Further, as shown in FIG. 17B, between the fixed electrodes 2010, 2011 and the reflective mirror 2007, a voltage can be applied selectively via switches SW1, SW2, respectively. Therefore, alternately turning on and off the switches SW1 and SW2 to alternately apply a voltage to the paired fixed electrodes 2010, 2011 can swing the reflective mirror 2007 around the torsion axis CL corresponding with the paired supporting members 2008.

However, these first and second conventional examples have problems described below.

In the first conventional example, to activate the mirror part 1002 at a high speed and with a large angle of deflection, it is desirable that the moment of inertia of the scanning mirror 1001 around the torsion axis 1005 is small. A possible approach for reducing the moment of inertia of the scanning mirror 1001 in the arrangement according to the first conventional example is to reduce the thickness of the supporting members 1004. However, if the thickness of the supporting members is reduced, the rigidity thereof is also reduced. Therefore, when the scanning mirror 1001 is activated to torsionally vibrate at a high speed, the scanning mirror 1001 significantly fluctuates in position because of the inertial force caused by the self-weight thereof. Thus, there is a problem that it is difficult to provide both of action of the scanning mirror at a high speed and with a large angle of deflection and optical characteristics of the optical deflector.

In addition, if a high magnetism generating power is required, the thickness of the permanent magnet 1003 has to be increased. Thus, there is another problem that the moment of inertia of the scanning mirror 1001 significantly increases, and the center of gravity of the scanning mirror 1001 is largely displaced from the torsion axis 1005 and a stable torsional vibration cannot be attained.

In the second conventional example, to activate the reflective mirror 2007 with a large angle of deflection, the projection 2009b of the mirror-side comb section and the electrode-side comb section 2012 are required to have a sufficient height in order to avoid interference between the reflective mirror 2007 and the base 2002. Thus, there is a problem that the moment of inertia of the reflective mirror 2007 inevitably increases as the angle of deflection increases, and it is difficult to provide both driving characteristics of high speed and a large angle of deflection.

In addition, in the second conventional example, since an electrostatic actuator requires a higher voltage than an electromagnetic actuator, the power supply unit inevitably has a large size. Thus, there is a problem that, even if the optical deflector can be reduced in size, the driving unit still has a large size, and the size of the whole device is still large.

SUMMARY OF THE INVENTION

The present invention has been devised in view of the problems of prior art described above.

It is, therefore, an object of the present invention to provide an optical deflector that can be driven at a high speed with a low voltage, provides a large angle of deflection and a low distortion even in high speed operation, and has a high static flatness of a reflective surface and a small size. Another object of the present invention is, a method of producing the optical deflector and an optical device using the optical deflector.

According to a first aspect of the present invention, there is provided an optical deflector, comprising:

a supporting substrate having an elastic supporting part;
a movable plate having a reflective surface on one side thereof and a magnetic material on another side thereof and supported at both ends thereof by the elastic supporting part so as to be torsionally vibratable around a torsion axis; and
magnetism generating means provided in the vicinity of and spaced apart from the magnetic material, for driving the movable plate relative to the supporting substrate to deflect a light incident on the reflective surface,
wherein the another side of the movable plate has at least two recesses, and the magnetic material is provided in the recesses.

According to a second aspect of the present invention, there is provided a method of producing an optical deflector having a supporting substrate, an elastic supporting part and a movable plate, comprising the steps of:

preparing a silicon substrate having a first side for formation of a reflective surface and a second side;
forming mask layers on the first and the second sides of the silicon substrate;
removing the mask layer on the first side except an area thereof for formation of the supporting substrate, elastic supporting part and movable plate;
removing the mask layer on the second side except an area thereof for formation of the supporting substrate, elastic supporting part and movable plate and also removing the mask layer on an area for formation of a recess within the area for formation of the movable plate;
dipping the silicon substrate in an aqueous alkaline solution to perform anisotropic etching to divide the silicon substrate into the supporting substrate, the elastic supporting part and the movable plate and to form the recess on one side of the movable plate;
removing the mask layers on the silicon substrate;
forming a reflective film on the first side of the movable plate; and
providing a magnetic material in the recess.

DETAILED DESCRIPTION OF THE PREFERRED EMBODIMENTS

In the following, preferred embodiments of the invention will be described in detail with reference to the drawings.
(First Embodiment)
(Entire Configuration and Mirror (Movable Plate))

Figure 1:
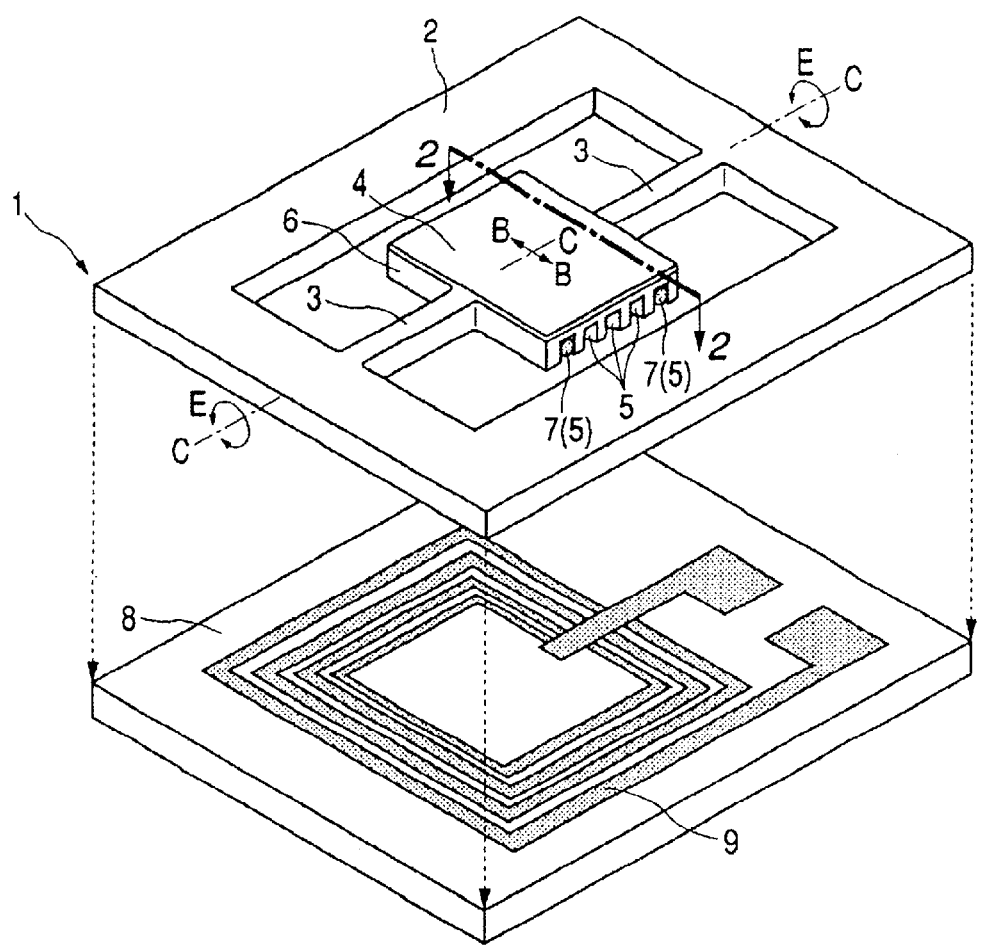
FIG. 1 is a perspective view of an optical deflector according to a first embodiment of the invention.

FIG. 1 is a perspective view showing a configuration of an optical deflector according to a first embodiment of the invention. In FIG. 1, an optical deflector 1 comprises a supporting substrate 2, a movable plate 6, and elastic supporting parts 3, the movable plate 6 being supported at both ends thereof on the supporting substrate 2 via the elastic supporting parts 3. The elastic supporting parts 3 support the movable plate 6 in such a manner that the movable plate 6 can be elastically and torsionally vibrated about a C axis (that is, a torsion axis) in a direction indicated by the arrow E. One surface of the movable plate 6 is a reflective surface 4 that constitutes a mirror surface, and torsional movement of the movable plate 6 in the E direction provides deflection of a light incident on the reflective surface 4 at a predetermined angle. The direction indicated by the arrow B in FIG. 1 is perpendicular to the torsion axis C and parallel to a plane in which the reflective surface 4 of the movable plate 6 is formed. The direction indicated by the arrow B is referred to as "movable plate width direction".

(Magnet and Recess)

In a surface of the movable plate 6 opposite to the reflective surface 4 (hereinafter, referred to as "back surface"), a plurality of recesses 5 is formed parallel to the B direction. This back surface refers to a surface of the movable plate 6 opposite to the reflective surface 4, that is, a surface having no reflective surface formed thereon. In particular, in two of the plurality of recesses 5, permanent magnets 7, for example rare-earth permanent magnets containing samarium-iron-nitrogen, are embedded. The permanent magnets 7 are each magnetized to opposite polarities with the torsion axis C therebetween.

(Integral Formation and Mirror Substrate)

The supporting substrate 2, the movable plate 6, the reflective surface 4, the elastic supporting parts 3, and the recesses 5 as described later are integrally formed from single-crystal silicon by a micromachining technique, which is an application of the semiconductor producing technology.

(Description of Coil Substrate)

A coil substrate 8 is disposed parallel to the supporting substrate 2 in such a manner that a coil 9 serving as a magnetism generating means is placed in the vicinity of the permanent magnets 7 and at a desired distance therefrom. The coil 9 is formed integrally on a surface of the coil substrate 8 by, for example, electro-plating of copper in a convolute shape. The magnetism generating means and the magnets serves together as a driving means to drive the movable plate and the supporting substrate relative to each other. Specifically, the movable plate can torsionally be vibrated with respect to the supporting substrate.

(Action)

Figure 2:
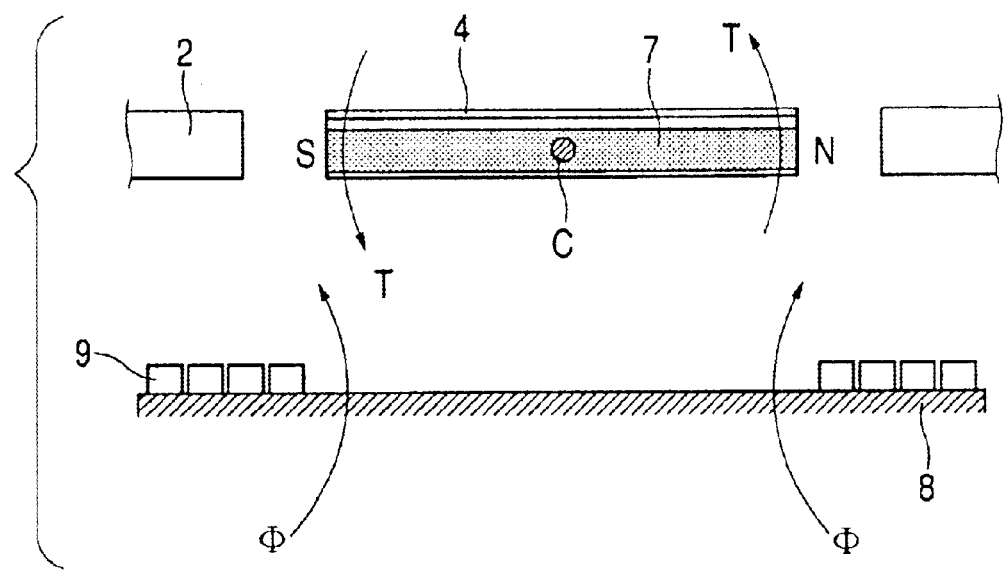
FIG. 2 is a cross-sectional view taken along the line 2—2 in FIG. 1.

Referring to FIG. 2, an action of the optical deflector 1 according to this embodiment will be described. FIG. 2 is a cross-sectional view of the optical deflector 1 shown in FIG. 1, taken along the line 2—2 in FIG. 1. As shown in FIG. 2, the permanent magnet 7 is magnetized to opposite polarities on both sides of the torsion axis C, and the direction of magnetization is as shown in the figure, for example. When the coil 9 is energized, a magnetic flux Φ is produced in a direction, for example as shown in FIG. 2, depending on the direction of the applied current. At the magnetic poles of the permanent magnet 7, attractive force and repulsive force are generated, respectively, in relation to the direction of the magnetic flux, and a torque T is applied to the movable plate 6, which is elastically supported around the torsion axis C. Similarly, if the current is applied to the coil 9 in the opposite direction, the torque T is applied thereto in the opposite direction. Therefore, as shown in FIG. 2, the movable plate 6 can be driven to any angle depending on the current applied to the coil 9.

(Resonance)

Furthermore, if an alternating current is applied to the coil 9, the movable plate 6 can be torsionally vibrated continuously. In this case, if the frequency of the alternating current is made substantially coincide with the resonance frequency of the movable plate 6 to make the movable plate 6 resonate, a larger angle displacement can be provided.

(Scale)

For example, the optical deflector 1 of this embodiment is driven at a frequency of 19 kHz, which is a resonance frequency of the movable plate 6, and with a mechanical angle displacement of ±10°. The supporting substrate 2, the movable plate 6 and the elastic supporting parts 3 all have an equal thickness of 150 $\mu$m. The movable plate 6 has a width in the B direction of 1.3 mm and a length in the direction of torsion axis of 1.1 mm. Each of the elastic supporting parts 3 has a length of 2700 $\mu$m and a width of 68 $\mu$m. That is, the area of the surface of the movable plate is on the order of several mm$^2$ (in particular, 2 mm$^2$ or less), and thus, the supporting substrate with the movable plate is a microstructure.

(Detailed Description of Configuration of Movable Plate)

Figure 3:
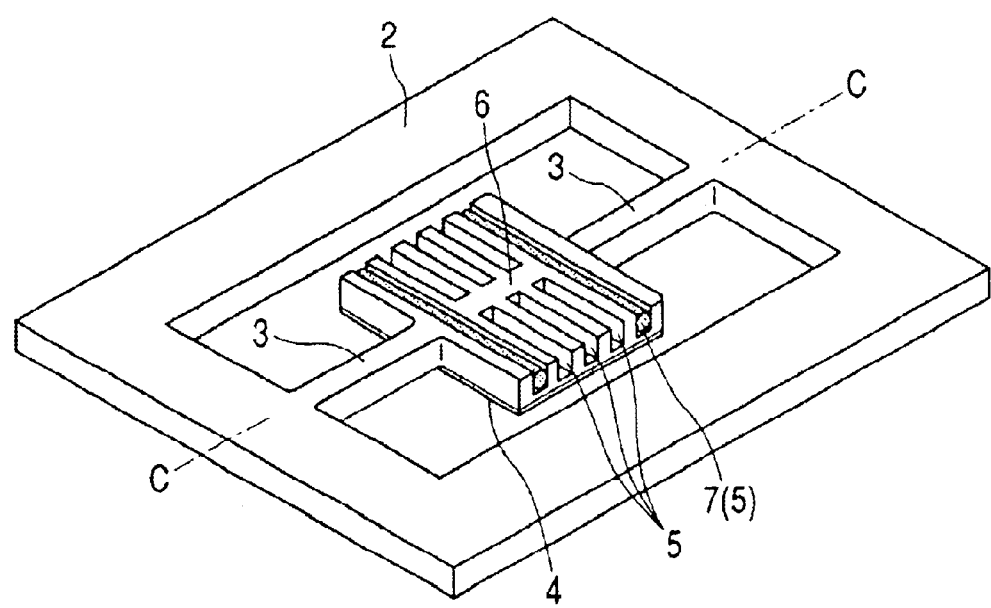
FIG. 3 is a perspective view illustrating a supporting substrate, a movable plate, an elastic supporting part, a recess and a permanent magnet of FIG. 1.

Here, FIG. 3 is a perspective view of the supporting substrate 2, viewed from the backside thereof.

As shown in FIG. 3, in this embodiment, a plurality of recesses 5 parallel to the B direction are formed in the back surface of the movable plate 6. In particular, in two of the plurality of recesses 5, permanent magnets 7 are embedded parallel to the B direction.

Thus, according to this embodiment, the movable plate 6 is reduced in weight and the moment of inertia about the torsion axis C is also reduced, as compared to the case where the movable plate is a simple rectangular-parallelepiped member without any recess. In particular, the moment of inertia of the movable plate 6 is determined by the total sum of the products of the masses of the fractional parts of the movable plate 6 and the squares of the distances of the respective parts from the torsion axis C. Therefore, provision of the recesses 5 in the movable plate 6 as shown in FIG. 3, which results in less of a weight of silicon at an increasing distance from the torsion axis C, can effectively reduce the moment of inertia thereof.

On the other hand, as shown in FIG. 3, the plurality of recesses 5 formed in the movable plate 6 are arranged along the torsion axis C in rows (the direction of each of the recesses is perpendicular to the torsion axis C), and solid parts between the rows allow the movable plate 6 to be effectively supported. Thus, in the optical deflector 1 according to this embodiment, the moment of inertia of the movable plate 6 can be effectively reduced while maintaining a sufficient rigidity thereof. In addition, no recess 5 is provided near the torsion axis C (in other words, no recess is provided at the center of the movable plate 6, or there is no recess extending over the torsion axis C). As a result, more solid parts are provided near the torsion axis C. When the movable plate 6 is torsionally vibrated, a larger bending moment is loaded on a part nearer to the torsion axis C. Therefore, arrangement of the recesses 5 as shown in FIG. 3 can provide a minimum loss of rigidity of the mirror (or rigidity of the movable plate).

(Description of Shape of Magnet)

The permanent magnets 7 of this embodiment are embedded in the recesses 5 formed in the movable plate 6. In the figure, two of the plurality of recesses are provided extending over the torsion axis C, and these two recesses have permanent magnets embedded therein. The two recesses having the permanent magnets provided therein are disposed at positions nearest the respective elastic supporting parts 3. By embedding the permanent magnets 7 in the recesses 5 formed in the movable plate 6, an additional rigidity can effectively be provided to the movable plate 6, which has been reduced in rigidity because of provision of the recesses 5. In particular, the recesses 5 formed are parallel to the B direction and in an elongated shape, and the permanent magnets 7 provided therein have a similar shape. In this case, the rigidity of the movable plate 6 (or rigidity of the mirror) can be increased without significantly increasing the moment of inertia of the movable plate 6.

Furthermore, if the permanent magnet 7 is made of a material having a higher Young's modulus than the material of the movable plate 6 (single-crystal silicon in the case of the optical deflector 1 of this embodiment), the movable plate 6 can have a higher rigidity than in the case where the movable plate is a simple rectangular-parallelepiped member without any recess 5.

Furthermore, according to this embodiment, when compared to a case where the permanent magnet 7 is placed on the surface of the movable plate 6, the permanent magnet 7 can be placed close to the torsion axis C, and thus, the moment of inertia of the movable plate 6 can be reduced.

In addition, since the center of gravity of the movable plate 6 is also located closer to the torsion axis C, stable torsional vibration with less undesirable fluctuations can be attained.

(Shape of Magnet)

In addition, such a shape of the permanent magnet 7 of the optical deflector 1 according to this embodiment is advantageous also in terms of torque generation. In other words, the shape of the permanent magnet has a good effect on torque generation. In order to generate a large torque, it is desirable that the permanent magnet 7 provided in the movable plate 6 has as high a residual flux density as possible. As generally known, magnets are subject to self-demagnetization depending on their shapes, and therefore, for example, a cylindrical magnet having a larger ratio L/D between the diameter D and the length L (having a shape with a larger permeance coefficient) has a lower self demagnetization and, thus, a higher residual flux density. The permanent magnet 7 of the invention, which is embedded in the elongated recess 5 parallel to the B direction and thus has a low self-demagnetization and a high residual flux density, can provide an actuator capable of generating a large torque.

In FIG. 1, the reflective surface 4 serves as an optical deflector element. However, if the reflective surface 4 is replaced with a reflective diffraction grating, an optical deflector that is operated in the same manner by torsional vibration of the movable plate 6 can be provided. In this case, deflection of the incident light provides diffracted light. Therefore, a plurality of deflected light beams can be derived from one incident light beam. In the embodiments described below, description will be made for the case where the reflective surface 4 is used as the optical deflector element. However, in all the embodiments described below, the reflective surface 4 can be replaced with the reflective diffraction grating.

(Second Embodiment)

Figure 4:
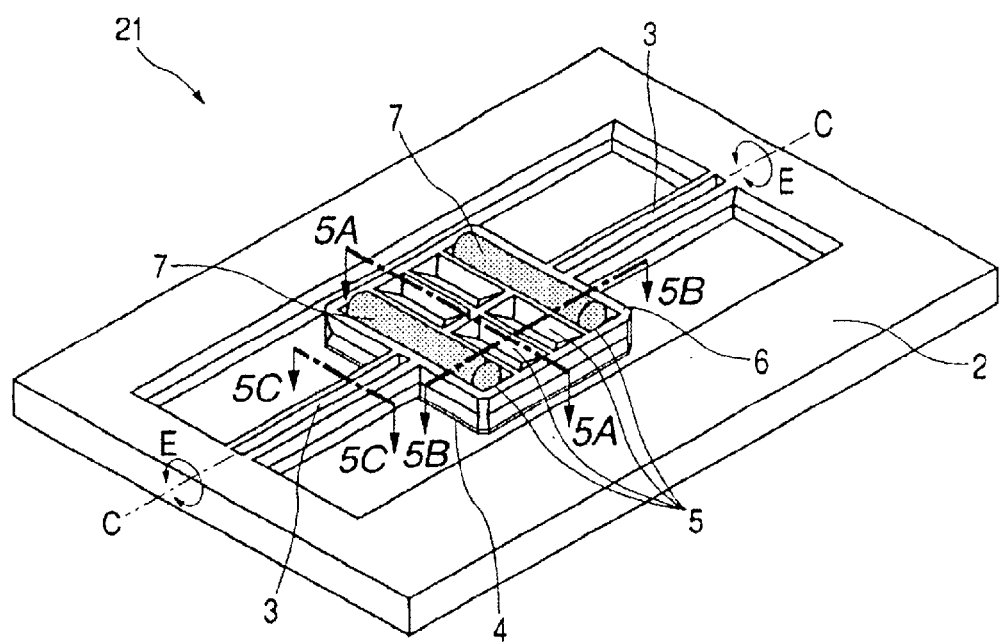
FIG. 4 is a perspective view of an optical deflector according to a second embodiment of the invention.

FIG. 4 is a perspective view of an optical deflector according to a second embodiment of the invention. An optical deflector 21 of this embodiment is essentially the same in driving principle as the optical deflector 1 of the first embodiment. Furthermore, as in the first embodiment, the optical deflector 21 is integrally formed from single-crystal silicon by a micromachining technique, which is an application of the semiconductor producing technology.

The difference between FIG. 4 and FIG. 1 is the configuration of the supporting substrate 2, the elastic supporting parts 3, the movable plate 6, the recess 5, and the permanent magnet 7. These differences will be described in the following section. Here, in FIG. 4, parts identical to those in FIG. 1 are assigned the same reference numerals.

Figure 5A:
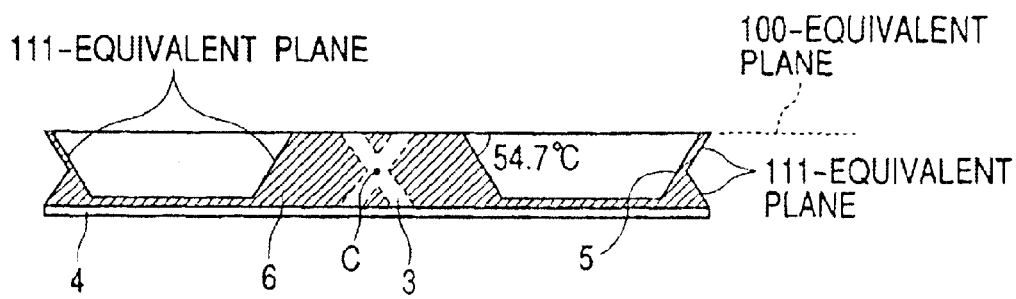
FIGS. 5A, 5B and 5C are cross-sectional views taken along the lines 5A—5A, 5B—5B and 5C13 5C in FIG. 4, respectively.
Figure 5B:
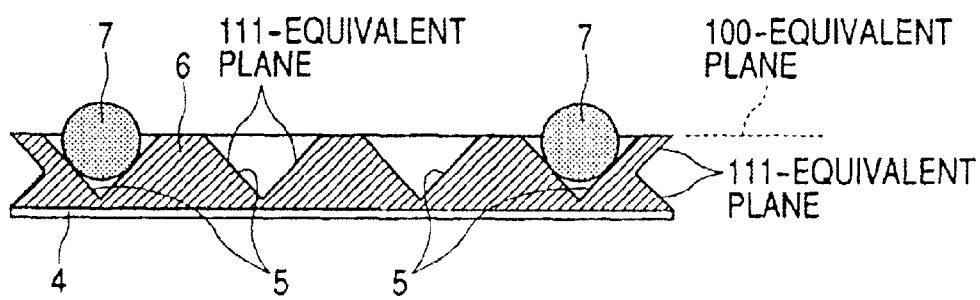
Figure 5C:
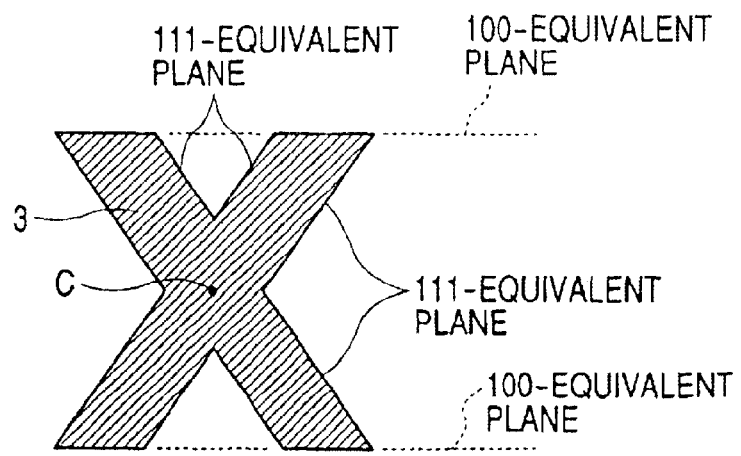

FIG. 5A is a cross-sectional view taken along the line 5A—5A in FIG. 4, FIG. 5B is a cross-sectional view taken along the line 5B—5B in FIG. 4, and FIG. 5C is a cross-sectional view taken along the line 5C—5C in FIG. 4. The respective surfaces of the elastics supporting parts 3 and the recess are constituted by (111)-equivalent planes of single-crystal silicon, as shown in FIGS. 5A and 5B. The recess is provided so as not to extend over the torsion axis. Here, for example, a (−1-11) plane, a (11-1) plane and the like are collectively referred to as (111)-equivalent plane, and a (−100) plane and the like are collectively referred to as (100)-equivalent plane. The (100)-equivalent plane and the (111)-equivalent plane of silicon form an angle of about 54.7° with each other, as shown in FIG. 5A. Therefore, as can be seen from FIG. 5A, the side and back surfaces of the movable plate 6 can be constituted by the (111)-equivalent planes in a concave shape. As can be seen from FIG. 5C, the cross section of the elastic supporting part 3 taken along the line 5C—5C is in the shape of the letter X formed by the (111)- and (100)-equivalent planes.

As can be seen from FIG. 5B, the recess 5 formed in the back surface of the movable plate 6 has a cross section, taken along the line 5B—5B, in the shape of the letter V formed by the (111)-equivalent planes. As shown in FIGS. 4 and 5B, permanent magnets 7, which are formed from an iron-cobalt-chromium alloy wire, for example, have a cylindrical shape and are fitted into two of the recesses 5 and bonded thereto.

The recesses 5 and the permanent magnet 7 of this embodiment have the same effect as the recesses 5 and the permanent magnet 7 of the optical deflector 1 of the first embodiment. Furthermore, in the optical deflector 21 of this embodiment, since the movable plate 6 also has the concave shapes formed by the (111)-equivalent planes in its side wall, the moment of inertia of the movable plate 6 can be effectively reduced. In addition, since the permanent magnets 7 are in the shape of an elongated cylinder, self-demagnetization can be effectively reduced.

In the optical deflector 21 of this embodiment, the permanent magnet 7 having a circular cross section is fitted into the recess 5 having a V-shaped cross section. In particular, in the direction of the torsion axis C, the permanent magnet is secured by the (111)-equivalent planes of the recess 5 and can be positioned with a higher accuracy. Owing to this, variations among products in characteristics of the optical deflector, such as generated torque or resonance frequency, can be reduced.

In addition, since the cross section of the elastic supporting part 3 is in the shape of an X-shaped polygon formed by the (100)- and (111)-equivalent planes of silicon, the movable plate 6 can be elastically supported with torsional rotation thereof about the torsion axis C being facilitated and displacement in directions perpendicular to the torsion axis C being reduced. Due to the elastic supporting part 3 having such an X-shaped cross section, fluctuations of the movable plate 6 other than the torsional vibration about the torsion axis C are prevented from occurring, and an optical deflector with less disturbance can be provided.

(Method of Production)

Figure 12A:
FIGS. 12A, 12B, 12C, 12D, and 12E are views illustrating a method of producing the optical deflector shown in FIG. 4.

Now, a method of producing the supporting substrate 2, the elastic supporting part 3, the movable plate 6 and the recess 5 will be described with reference to FIGS. 12A to 12E. FIGS. 12A to 12E show steps of the method of producing the supporting substrate 2, the elastic supporting part 3, the movable plate 6 and the recess 5 by anisotropic etching using an aqueous alkaline solution according to this embodiment. These drawings show schematic cross sections thereof taken along the line 5A—5A in FIG. 4 in the respective steps. First, as shown in FIG. 12A, silicon-nitride mask layers 101 are formed on both surfaces of a planar silicon substrate 104 by low pressure chemical vapor deposition or the like.

Figure 12B:
Figure 12C:

Then, as shown in FIG. 12B, the mask layer 101 on the surface on which the reflective surface 4 is to be formed is patterned in accordance with contours of the supporting substrate 2, the movable plate 6 and the elastic supporting part 3 to be formed. This patterning is conducted by normal photolithography and dry etching using a gas having an erosive action on silicon nitride ($CF_4$, for example). In addition, as shown in FIG. 12C, the mask layer 101 on the surface on which no reflective surface 4 is to be formed is patterned in accordance with contours of the supporting substrate 2, the movable plate 6, the elastic supporting part 3 and the recess 5 to be formed. This patterning is conducted in the same manner as that shown in FIG. 12B.

Figure 12D:
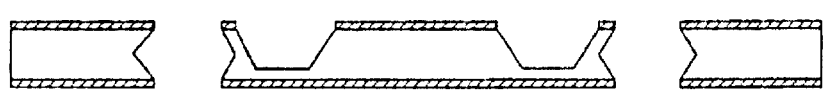

Then, as shown in FIG. 12D, anisotropic etching is performed by dipping the substrate for a desired time in an aqueous alkaline solution having significantly different erosion rates for crystal faces of single-crystal silicon (for example, an aqueous potassium hydroxide solution, an aqueous tetramethylammonium hydroxide solution, etc.), thereby forming the supporting substrate 2, the movable plate 6, the elastic supporting part 3 and the recess 5 which are shaped as shown in FIG. 12D. In the anisotropic etching, the etch rate is greater for the (100)-equivalent plane and smaller for the (111)-equivalent plane. Therefore, the silicon substrate 104 is etched from the front and back surfaces thereof, and due to the relation of the patterns of the mask layers 101 with the silicon crystal faces, the silicon substrate 104 can be precisely etched into a shape formed by the (100)-equivalent planes covered with the mask layers 101 and the (111)-equivalent planes. That is, by this alkaline anisotropic etching, the recess 5 constituted by the (111)-equivalent planes is formed in the back surface of the movable plate 6, and the concave shape constituted by the (111)-equivalent planes is formed in the side faces thereof. At the same time, in this etching step, the elastic supporting parts 3 are also worked in the form of an X-shaped polygon formed by the (100)- and (111)-equivalent planes (see FIG. 5C).

Figure 12E:
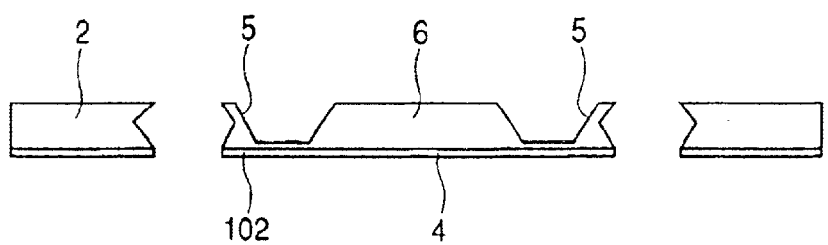

Then, as shown in FIG. 12E, the silicon nitride mask layers 101 are removed, and a metal having a high reflectivity (for example, aluminum) is vacuum-evaporated as the reflective surface 4. In this way, the supporting substrate 2, the movable plate 6 with the recesses 5, the reflective surface 4 and the elastic supporting parts 3 are integrally formed.

Finally, a wire of metal magnet (for example, an iron-cobalt-chromium alloy) that is easy to process is cut into a desired length and bonded into the recess 5 by an adhesive or the like. Then, the metal magnetic wire is magnetized to provide the permanent magnet 7 (as for the direction of magnetization, see FIG. 2). In this way, the optical deflector 21 shown in FIG. 4 is completed.

As described above, according to the method of producing the optical deflector 21 of this embodiment, both the movable plate 6 and the elastic supporting parts 3 can be formed in a single alkaline anisotropic etching process, and thus, mass production at an extremely low cost can be attained. In addition, since changes in design or the like can be provided for by adjusting the lithographic mask pattern and the etching time, the optical deflector can be produced at a lower cost and with a short development period. In addition, since the shapes of the movable plate 6 and the elastic supporting parts 3 are determined by the (111)-equivalent planes of single-crystal silicon, they can be processed with a higher precision.

In addition, since the permanent magnet 7 is formed by cutting a wire having a circular cross section, the optical deflector can be produced at a lower cost and with a higher processing precision.

(Third Embodiment)

Figure 6:
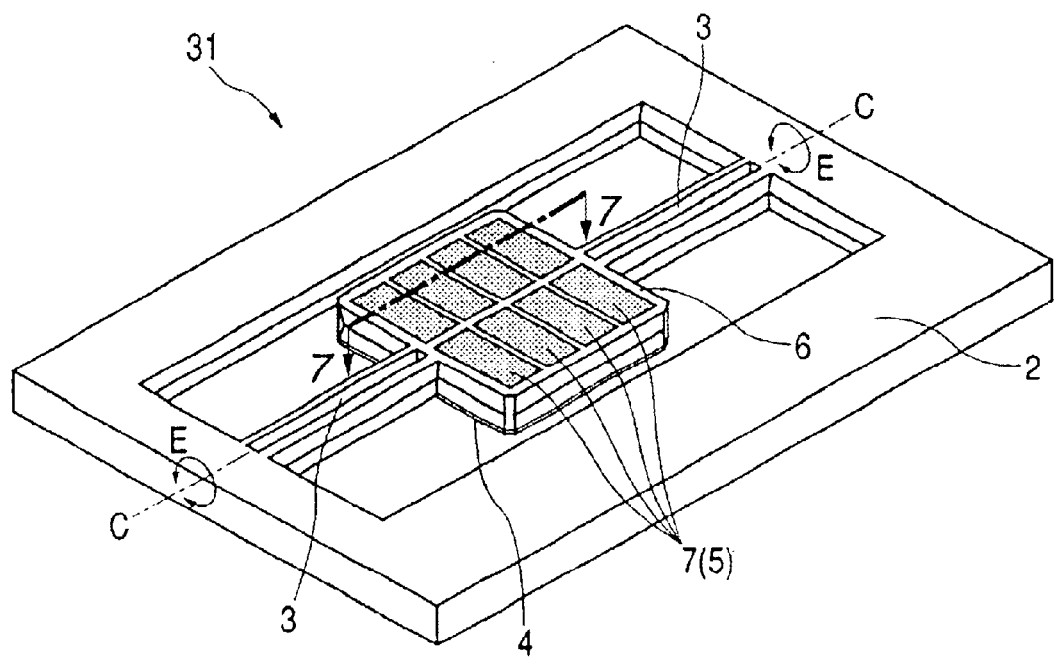
FIG. 6 is a perspective view of an optical deflector according to a third embodiment of the invention.

FIG. 6 is a perspective view of an optical deflector according to a third embodiment of the invention.

An optical deflector 31 according to this embodiment has the supporting substrate 2 and the elastic supporting parts 3 similar to those of the optical deflector 21 of the second embodiment, which have the same effect as those of the optical deflector 21. Furthermore, as in the second embodiment, the optical deflector 31 is integrally formed from single-crystal silicon by a micromachining technique, which is an application of the semiconductor producing technology.

The difference of FIG. 6 from FIG. 4 is the configuration of the recess 5 and the permanent magnet 7, and these will be described in particular in the following. Here, in FIG. 6, parts identical to those in FIG. 4 are assigned the same reference numerals.

Figure 7:
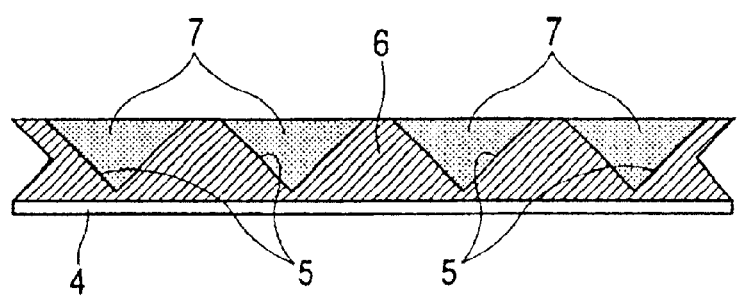
FIG. 7 is a cross-sectional view taken along the line 7—7 in FIG. 6.

FIG. 7 is a cross-sectional view taken along the line 7—7 in FIG. 6. The inner surfaces of the recess 5 are constituted by (111)-equivalent planes of single-crystal silicon wafer as with the optical deflector 21 of the second embodiment, and as shown in FIG. 7, the cross section of the recess 5 taken along the line 7—7 is in the shape of the letter V. In particular, in the optical deflector 31 of this embodiment, all the recesses 5 formed in the movable plate 6 are arranged symmetrically with respect to the torsion axis C, and no recess 5 is formed in the vicinity of the torsion axis C.

All the recesses 5 formed in the movable plate 6 have the respective permanent magnets 7 embedded therein.

The recesses 5 and the permanent magnets 7 in this embodiment have the same effects as the recesses 5 and the permanent magnets 7 of the optical deflector 1 of the first embodiment. However, in the optical deflector 31 of this embodiment, since no recess 5 is formed in the vicinity of the torsion axis C, rigidity of the movable plate 6 due to formation of the recesses 5 can be further reduces. In addition, since all the recesses are filled with the permanent magnets 7, even if the movable plate 6 is thin and the recesses 5 can have only an insufficient depth, the magnet can be used in an increased amount and a high generating power can be obtained.

(Method of Production)

When producing the optical deflector according to this embodiment, the method of production shown in FIGS. 12A to 12E can be used. However, in the step shown in FIG. 12C, the pattern of the mask layer 101 corresponding to the recesses 5 is changed to that as shown in FIG. 6. Then, by sequentially conducting the steps shown in FIGS. 12D and 12E, the supporting substrate 2, the movable plate 6, the elastic supporting parts 3 and the recesses 5 are formed as shown in FIG. 6. Then, the permanent magnets 7 are electro-plated with an alloy containing nickel-cobalt-phosphor, for example, polished and embedded in all the recesses 5. Finally, magnetization is performed (as for the direction of magnetization, see FIG. 2) to provide the permanent magnets 7, and thus, the optical deflector 31 shown in FIG. 6 is completed.

(Fourth Embodiment)

Figure 8:
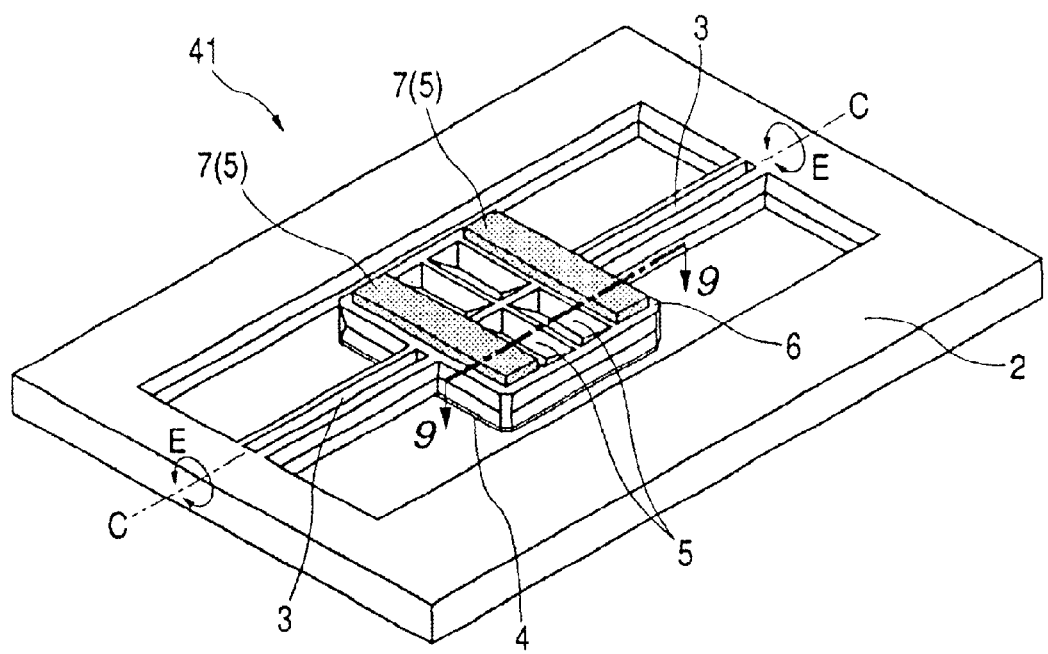
FIG. 8 is a perspective view of an optical deflector according to a fourth embodiment of the invention.

FIG. 8 is a perspective view of an optical deflector according to a fourth embodiment of the invention.

An optical deflector 41 according to this embodiment has the supporting substrate 2 and the elastic supporting parts 3 similar to those of the optical deflector 21 of the second embodiment, which have the same effect as those of the optical deflector 21. Furthermore, as in the second embodiment, the optical deflector 41 is integrally formed from single-crystal silicon by a micromachining technique, which is an application of the semiconductor producing technology.

The difference of FIG. 8 from FIG. 4 is the configuration of the recess 5 and the permanent magnet 7, and this will be described in particular in the following. Here, in FIG. 8, parts identical to those in FIG. 4 are assigned the same reference numerals.

Figure 9:
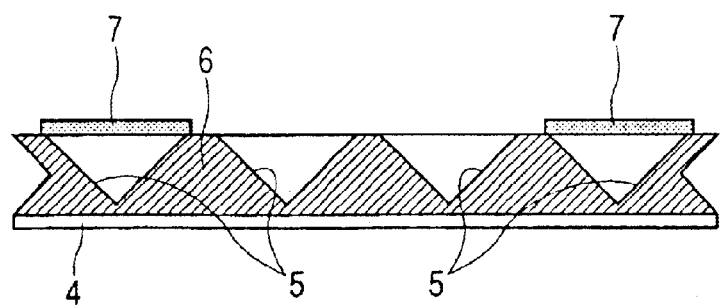
FIG. 9 is a cross-sectional view taken along the line 9—9 in FIG. 8.

FIG. 9 is a cross-sectional view taken along the line 9—9 in FIG. 8. The inner surfaces of the recess 5 are constituted by (111)-equivalent planes of single-crystal silicon wafer as with the optical deflector 21 of the second embodiment, and as shown in FIG. 9, the cross section of the recess 5 taken along the line 9—9 is in the shape of the letter V. In particular, in the optical deflector 41 of this embodiment, the permanent magnet 7 is in the form of a planar rectangular parallelepiped and provided above the recess 5 as shown in FIG. 9.

The recesses 5 and the permanent magnets 7 in this embodiment have the same effects as the recesses 5 and the permanent magnets 7 of the optical deflector 1 of the first embodiment.

However, in the optical deflector 41 of this embodiment, the permanent magnet 7 covers tops of the recess 5 to provide a hollow. Thus, the rigidity of the movable plate 6 reduced by formation of the recesses 5 can be effectively compensated for with less of an amount of permanent magnet 7.

(Method of Production)

When producing the optical deflector according to this embodiment, the method of production shown in FIGS. 12A to 12E can be used. By sequentially conducting the steps shown in FIGS. 12A to 12E, the supporting substrate 2, the movable plate 6, the elastic supporting parts 3 and the recesses 5 are formed as shown in FIG. 8.

Then, a sheet of metal magnet (for example, an iron-cobalt-chromium alloy) which is easy to process is cut into desired width and length to form a rectangular parallelepiped, which is then bonded over the recess 5 by an adhesive or the like. Finally, magnetization is performed (as for the direction of magnetization, see FIG. 2) to provide the permanent magnets 7. Thus, the optical deflector 41 shown in FIG. 8 is completed.

(Fifth Embodiment)

Figure 10:
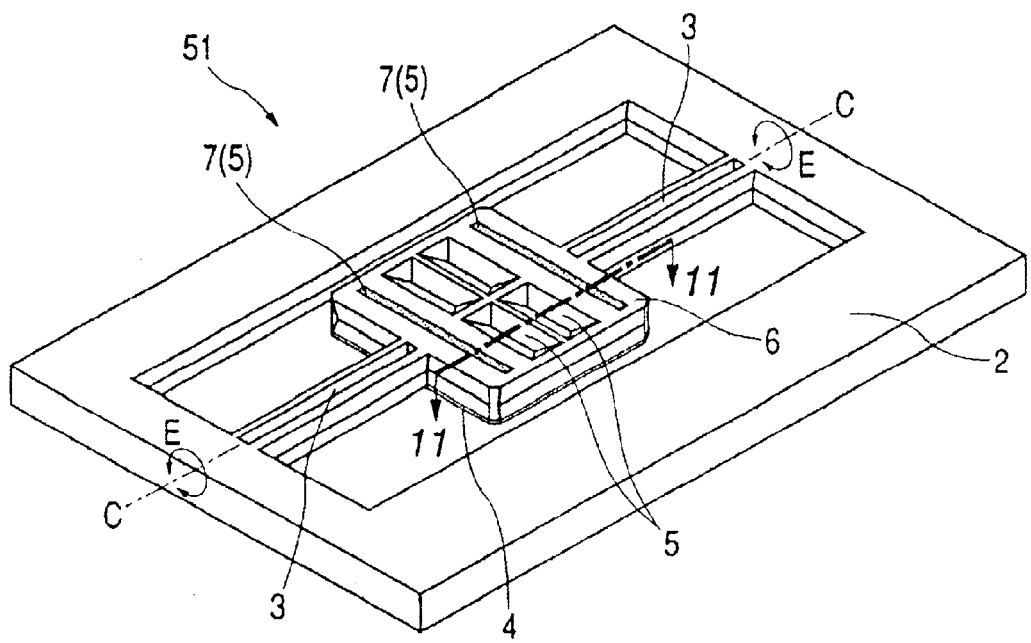
FIG. 10 is a perspective view of an optical deflector according to a fifth embodiment of the invention.

FIG. 10 is a perspective view of an optical deflector according to a fifth embodiment of the invention.

An optical deflector 51 according to this embodiment has the supporting substrate 2 and the elastic supporting parts 3 similar to those of the optical deflector 21 of the second embodiment, which have the same effect as those of the optical deflector 21. Furthermore, as in the second embodiment, the optical deflector 51 is integrally formed from single-crystal silicon by a micromachining technique, which is an application of the semiconductor producing technology.

The difference of FIG. 10 from FIG. 4 is the configuration of the recess 5 and the permanent magnet 7, and this will be described in particular in the following. Here, in FIG. 10, parts identical to those in FIG. 4 are assigned the same reference numerals.

Figure 11:
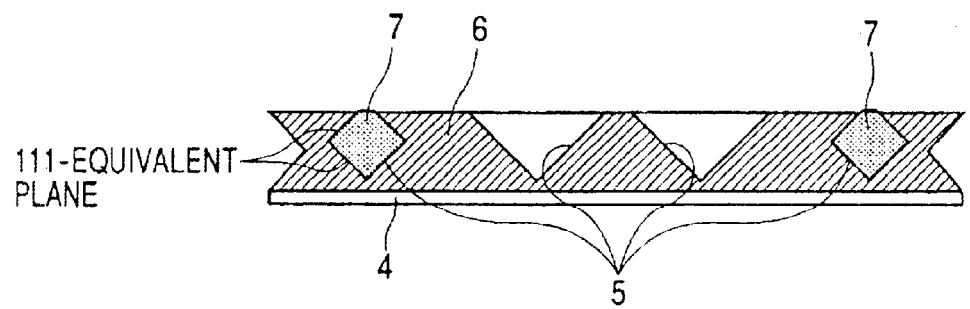
FIG. 11 is a cross-sectional view taken along the line 11—11 in FIG. 10.

FIG. 11 is a cross-sectional view taken along the line 11—11 in FIG. 10. The inner surfaces of the recess 5 are constituted by (111)-equivalent planes of single-crystal silicon wafer as with the optical deflector 21 of the second embodiment, and as shown in FIG. 11, the cross section, taken along the line 11—11, of a recess 5 in which the permanent magnet 7 is to be provided is in the shape of a rhombus, and the cross section of the other recesses 5 is in the shape of the letter V. In particular, in the optical deflector 51 of this embodiment, the permanent magnet 7 is embedded in the recess 5 having a rhombic cross section.

The recesses 5 and the permanent magnets 7 in this embodiment have the same effects as the recesses 5 and the permanent magnets 7 of the optical deflector 1 of the first embodiment.

However, in the optical deflector 51 of this embodiment, as shown in FIG. 11, the recess 5 in which the permanent magnet 7 is embedded has a rhombic cross section. Therefore, even if adhesion between the permanent magnet 7 and the movable plate 6 is poor or even if the internal stress is high, the possibility that the permanent magnet 7 peels off from the movable plate 6 can be reduced.

(Method of Production)

Figure 13A:
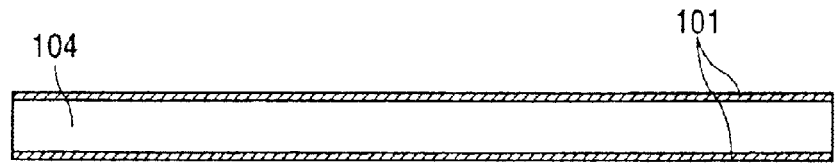
FIGS. 13A, 13B, 13C, 13D, 13E, and 13F are views illustrating a method of producing the optical deflector shown in FIG. 10.

Now, a method of producing the supporting substrate 2, the elastic supporting part 3, the movable plate 6 and the recess 5 will be described with reference to FIGS. 13A to 13F. FIGS. 13A to 13F shows steps in the method of producing the supporting substrate 2, the elastic supporting part 3, the movable plate 6 and the recess 5 by etching according to this embodiment. These drawings show schematic cross sections thereof taken along the line 11—11 in FIG. 10 in the respective steps. First, as shown in FIG. 13A, silicon-nitride mask layers 101 are formed on both surface of a planar silicon substrate 104 by low pressure chemical vapor deposition or the like.

Figure 13B:

Then, as shown in FIG. 13B, the mask layer 101 on the surface on which the reflective surface 4 is to be formed is patterned in accordance with contours of the supporting substrate 2, the movable plate 6 and the elastic supporting part 3 to be formed. This patterning is conducted by normal photolithography and dry etching using a gas having an erosive action on silicon nitride ($CF_4$, for example).

Figure 13C:
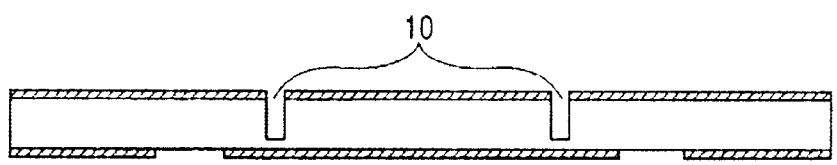

Then, as shown in FIG. 13C, the mask layer 101 on the surface opposite to the surface on which the reflective surface 4 is to be formed is patterned in accordance with the contour of a recess 5 in which the permanent magnet 7 is to be provided. Then, dry etching of the silicon is conducted using an ICP-RIE (Inductively Coupled Plasma-Reactive Ion Etching) device to form a groove 10.

Figure 13D:

Then, as shown in FIG. 13D, the mask layer 101 on the surface on which no reflective surface 4 is to be formed is patterned in accordance with contours of the supporting substrate 2, the movable plate 6, the elastic supporting part 3 and the other recesses 5 to be formed.

Figure 13E:
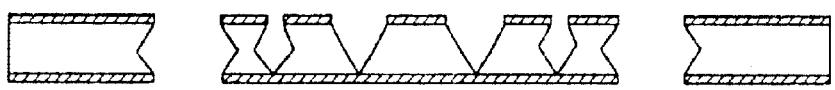

Then, as shown in FIG. 13E, anisotropic etching is performed by dipping the substrate for a desired time in an aqueous alkaline solution having significantly different erosion rates for crystal faces of single-crystal silicon (for example, an aqueous potassium hydroxide solution, an aqueous tetramethylammonium hydroxide solution), thereby forming the supporting substrate 2, the movable plate 6, the elastic supporting part 3 and the recess 5 which are shaped as shown in FIG. 13E. In the anisotropic etching, the etching rate is greater for the (100)-equivalent plane and smaller for the (111)-equivalent plane. Therefore, the silicon substrate 104 is etched from the front and back surfaces thereof, and due to the relation of the patterns of the mask layers 101 and the silicon crystal faces, the silicon substrate 104 can be precisely etched into a shape formed by the (100)-equivalent planes covered with the mask layers 101 and the (111)-equivalent planes. That is, by this alkaline anisotropic etching, the recess 5 constituted by the (111)-equivalent planes is formed in the back surface of the movable plate 6, and the concave shape constituted by the (111)-equivalent planes is formed in the side faces thereof. At the same time, in this etching step, the elastic supporting parts 3 is also provided in the form of an X-shaped polygon formed by the (100)- and (111)-equivalent planes (see FIG. 5C). In particular, at the region where the groove 10 is previously formed, a recess having a rhombic cross section is provided.

Figure 13F:
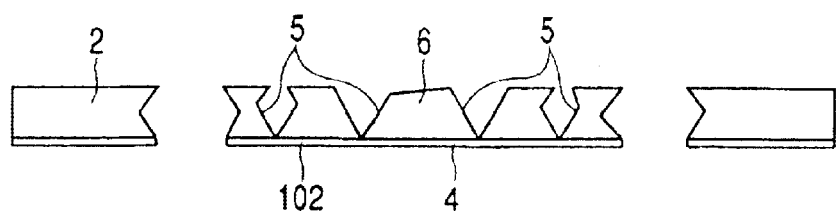

Then, as shown in FIG. 13F, the silicon nitride mask layers 101 are removed, and a metal having a high reflectivity (for example, aluminum) is vacuum-evaporated as the reflective surface 4. In this way, the supporting substrate 2, the movable plate 6 with the recesses 5, the reflective surface 4 and the elastic supporting parts 3 are integrally formed.

Then, a magnetic material in a paste form, which is a mixture of rare-earth material powder containing samariumiron-nitrogen and a bonding material, is applied into the recess 5. Here, silk-screen printing can be used to apply the magnetic material only to the recess 5 having the rhombic cross section. Finally, after heat treatment in a magnetic field, magnetization is conducted to form the permanent magnet 7 (as for the direction of magnetization, see FIG. 2). In this way, the optical deflector 51 shown in FIG. 10 is completed.

(Sixth Embodiment)

Figure 14:
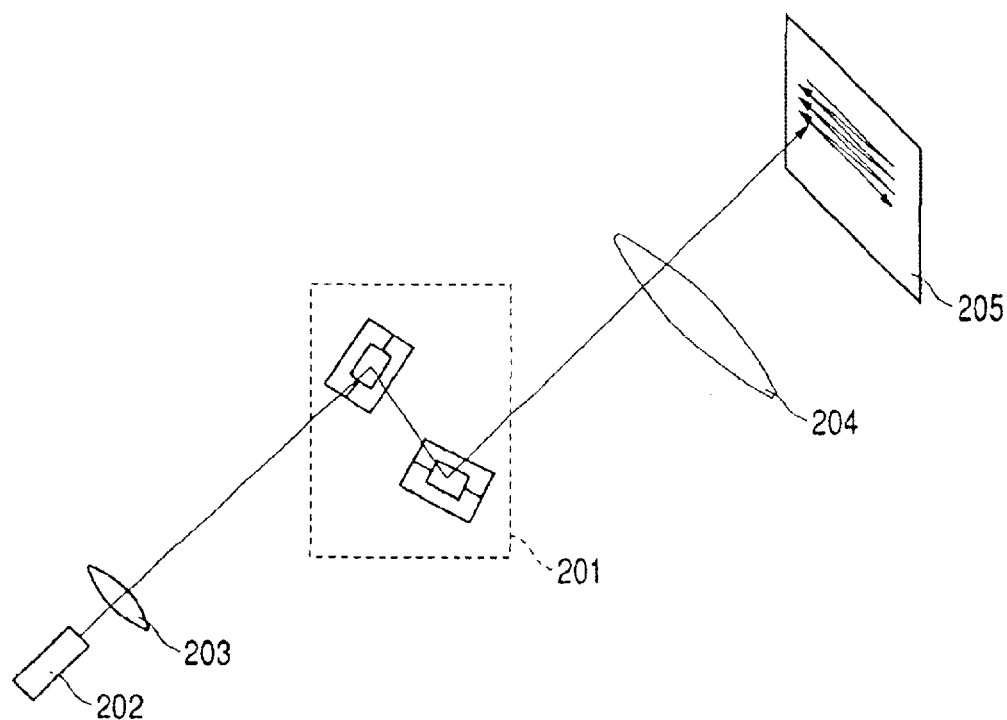
FIG. 14 is a view showing an embodiment of an optical device using an optical deflector of the invention.

FIG. 14 shows an embodiment of an optical device using any one of the optical deflectors described above. In this embodiment, an image display device is adopted as the optical device. In FIG. 14, reference numeral 201 denotes an optical deflector group having two optical deflectors according to any one of the first to the fifth embodiments disposed with the deflection directions being perpendicular to each other. In this embodiment, the optical deflector group is used as an optical scanner device for raster-scanning an incident light in the horizontal and vertical directions. Reference numeral 202 denotes a laser source, reference numeral 203 denotes a lens or lens group, reference numeral 204 denotes a writing lens or writing lens group, and reference numeral 205 denotes a projection plane. An incident laser beam from the laser source 202 is subject to a predetermined intensity modulation associated with a scan timing and scans two-dimensionally under the action of the optical deflector group 201. The scanning laser beam forms an image on the projection plane 205 by means of writing lens 204. In short, the image display device according to this embodiment can be applied to display products.

(Seventh Embodiment)

Figure 15:
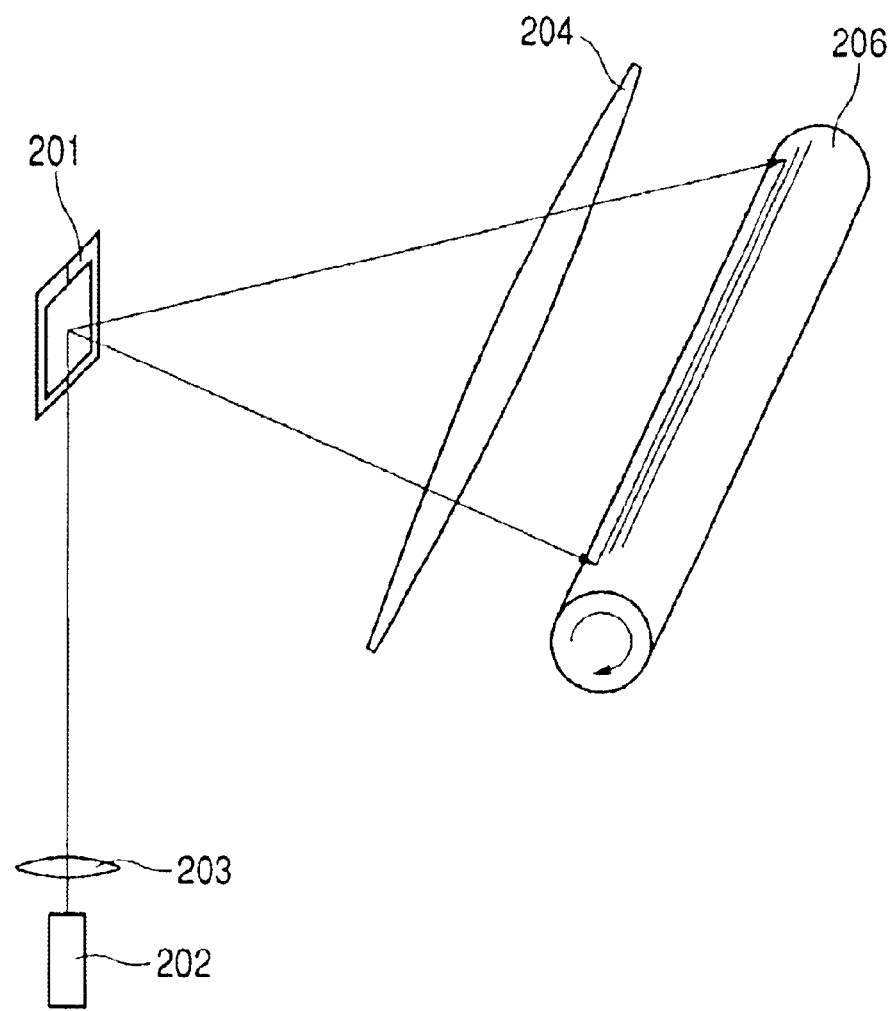
FIG. 15 is a view showing another embodiment of an optical device using an optical deflector of the invention.
Figure 16:
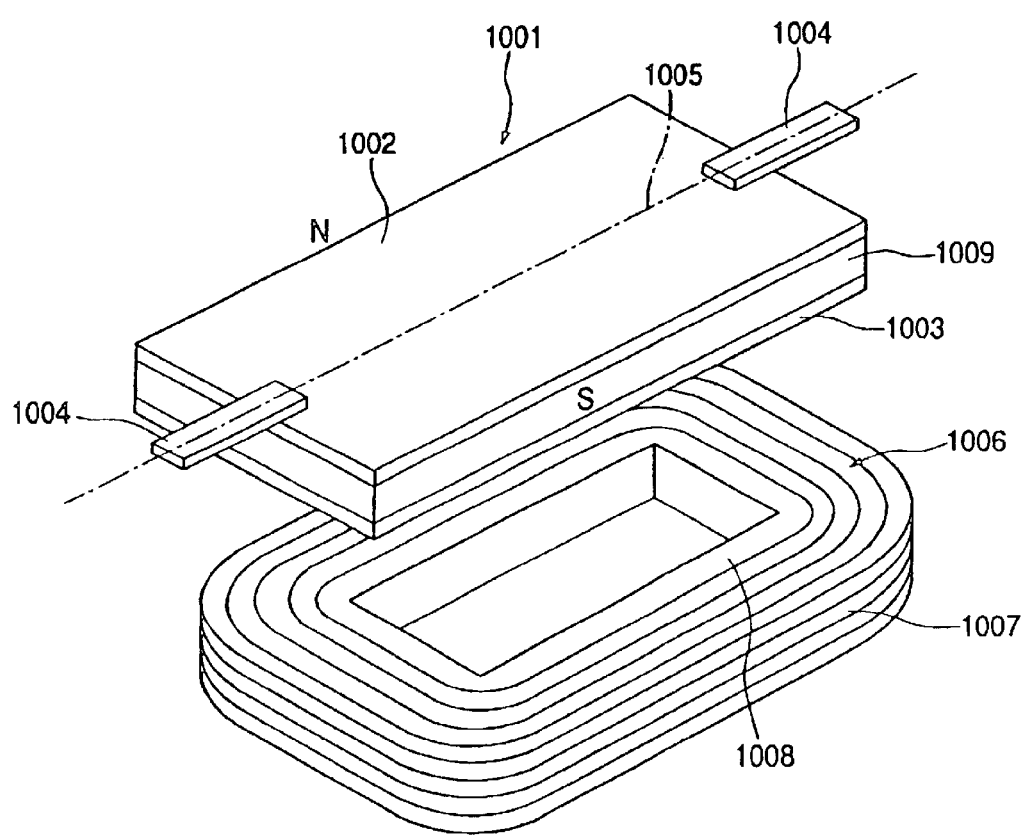
FIG. 16 is a view showing a first conventional optical deflector.
Figure 17A:
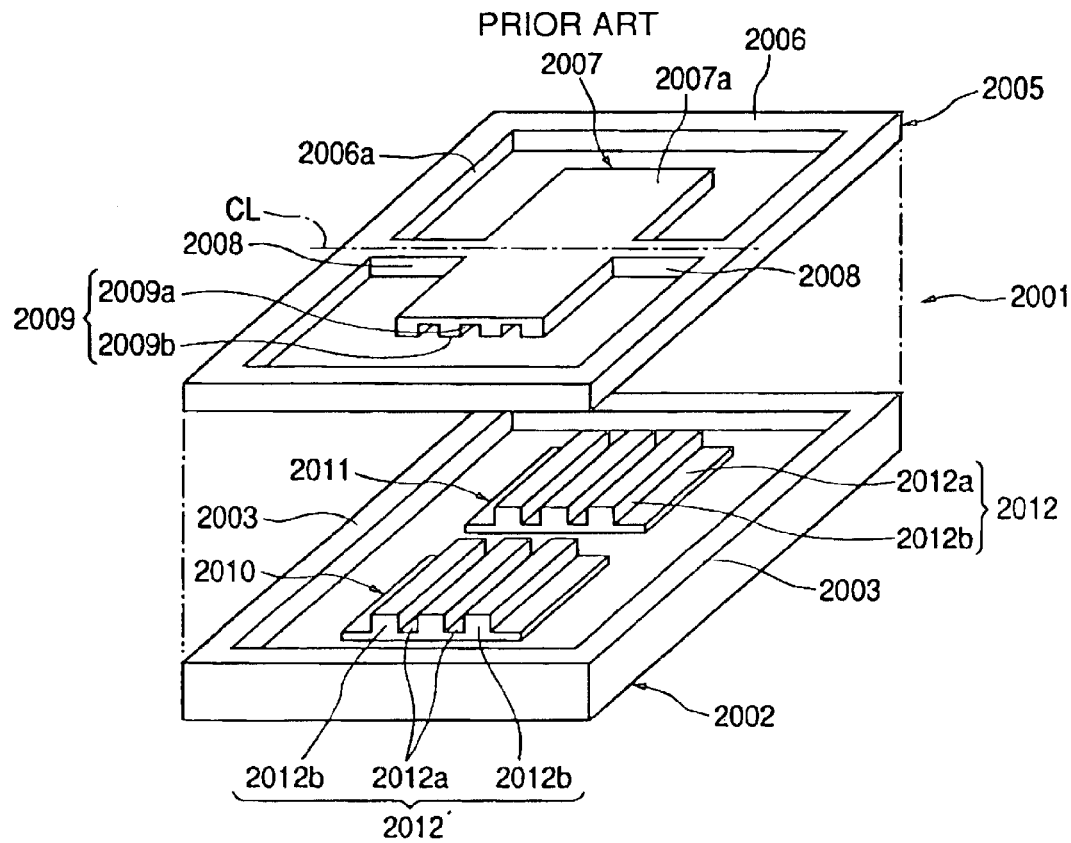
FIG. 17A is an exploded perspective view of a second conventional optical deflector.
Figure 17B:
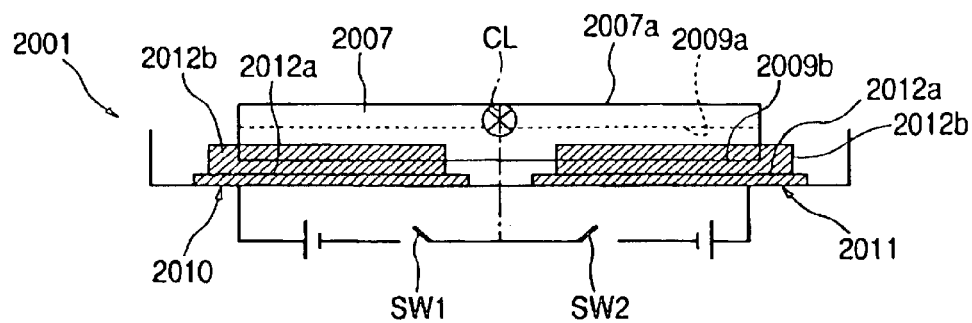
FIG. 17B is a schematic, longitudinal sectional view of the optical deflector of FIG. 17A.

FIG. 15 shows another embodiment of an optical device using any one of the optical deflectors described above. In this embodiment, an electrophotographic image forming device is adopted as the optical device. In FIG. 15, reference numeral 201 denotes an optical deflector according to any one of the first to the fifth embodiments, which is, in this embodiment, used as an optical scanner device for scanning an incident light one-dimensionally. Reference numeral 202 denotes a laser source. Reference numeral 203 denotes a lens or lens group, reference numeral 204 denotes a writing lens or writing lens group, and reference numeral 206 denotes a photosensitive body. A laser beam emitted from the laser source is subject to a predetermined intensity modulation associated with a scan timing and scans one-dimensionally under the action of the optical deflector 201. The scanning laser beam forms an image on the photosensitive body 206 by means of the writing lens 204.

The photosensitive body 206 is previously electrically charged uniformly by a charger (not shown), and the photosensitive body is scanned with a light beam to form an electrostatic latent image at the scanned area. Then, a developing device (not shown) develops the electrostatic latent image to form a toner image. Then, the toner image is transferred and fixed to a sheet of paper (not shown), for example, whereby the image is formed on the sheet of paper.

As described above referring to the embodiments, according to the optical deflector according to the present invention, since a recess is formed in a surface of a movable plate opposite to a reflective surface thereof, the moment of inertia of the movable plate can be reduced while assuring a high rigidity, and since a magnetic material is provided in the recess, the rigidity of the movable plate can be further increased. Furthermore, when compared to the case where a magnetic material is disposed on a surface of a movable plate, the magnetic material can be disposed close to a torsion axis, so that the moment of inertia of the movable plate 6 can be reduced.

Therefore, there can be realized a small optical deflector that can be driven at a high speed and provide a large angle of deflection with less power consumption and shows less deformation of a reflective surface even in high-speed operation.

What is claimed is:

1. An optical deflector, comprising:
   a supporting substrate having an elastic supporting part;
   a movable plate having a reflective surface on one side thereof and a magnetic material on another side thereof and supported at both ends thereof by the elastic supporting part so as to be torsionally vibratable around a torsion axis; and
   magnetism generating means provided in the vicinity of and spaced apart from the magnetic material, for driving the movable plate relative to the supporting substrate to deflect light incident on the reflective surface,
   wherein the another side of the movable plate has at least two recesses, and the magnetic material is provided in the recesses.

2. The optical deflector according to claim 1, wherein the recesses are spaced apart from the torsion axis of the movable plate and are not close to the torsion axis.

3. The optical deflector according to claim 1, wherein the supporting substrate, the elastic supporting part, the movable plate, and the recesses are integrally formed of single-crystal silicon.

4. The optical deflector according to claim 1, wherein the first side of the movable plate comprises a (100)-equivalent plane of a silicon crystal, and an inner surface of at least one of the recesses comprises a (111)-equivalent plane of a silicon crystal.

5. The optical deflector according to claim 1, wherein the elastic supporting part has an X-shaped cross section.

6. The optical deflector according to claim 1, wherein a side wall of the movable plate has a recess.

7. The optical deflector according to claim 1, wherein the recesses each have a substantially vertical side wall in a cross section taken along a line perpendicular to the direction of a width of the movable plate.

8. The optical deflector according to claim 1, wherein the recesses are each substantially V-shaped in a cross section taken along a line perpendicular to the direction of a width of the movable plate.

9. The optical deflector according to claim 1, wherein a cross section of each of the recesses which is parallel to the second side of the movable plate has a larger area within the movable plate than at a surface of the movable plate.

10. The optical deflector according to claim 1, wherein the magnetic material has a substantially circular cross section taken along a line perpendicular to the direction of a width of the movable plate.

11. The optical deflector according to claim 1, wherein, when viewed from above the surface of the movable plate having the recesses formed therein, the magnetic material overlies the recesses.

12. An optical device, comprising the optical deflector as set forth in claim 1.

13. A display device comprising the optical deflector as set forth in claim 1 and a light source, wherein the optical deflector performs deflection/scanning of light from the light source to form an image on a projection plane.

* * * * *

UNITED STATES PATENT AND TRADEMARK OFFICE
CERTIFICATE OF CORRECTION

PATENT NO. : 6,900,925 B2
DATED : May 31, 2005
INVENTOR(S) : Takahisa Kato et al.

It is certified that error appears in the above-identified patent and that said Letters Patent is hereby corrected as shown below:

Column 4,
Line 9, "5C13 5C" should read -- 5C-5C --.

Column 5,
Line 28, "serves" should read -- serve --.

Column 10,
Line 31, "reduces." should read -- reduced --.

Column 12,
Line 15, "surface" should read -- surfaces --; and
Line 56, "is" should read -- are --.

Column 14,
Line 4, "provide" should read -- provides --.

Signed and Sealed this

Thirteenth Day of December, 2005

JON W. DUDAS
*Director of the United States Patent and Trademark Office*